US007654581B2

(12) United States Patent
Cruikshank et al.

(10) Patent No.: US 7,654,581 B2
(45) Date of Patent: Feb. 2, 2010

(54) SECURITY DOCUMENT WITH ULTRAVIOLET AUTHENTICATION SECURITY FEATURE

(75) Inventors: David N. C. Cruikshank, Carleton Place (CA); Trevor Merry, Ottawa (CA); Laurence Marie-Francoise Suzzarini, Ottawa (CA)

(73) Assignee: Canadian Bank Note Company, Limited, Ottawa, Ontario (CA)

( * ) Notice: Subject to any disclaimer, the term of this patent is extended or adjusted under 35 U.S.C. 154(b) by 862 days.

(21) Appl. No.: 11/123,710

(22) Filed: May 6, 2005

(65) Prior Publication Data

US 2006/0249951 A1 Nov. 9, 2006

(51) Int. Cl.
*B42D 15/00* (2006.01)
*G09C 3/00* (2006.01)

(52) U.S. Cl. ............................ 283/89; 283/72; 283/74; 283/75; 283/85; 283/94; 283/107; 283/109; 283/111; 283/901

(58) Field of Classification Search .................... 40/1.5, 40/2 R; 101/171; 106/3, 11; 252/588, 589; 283/72, 75, 901, 904; 346/76 L, 135.1; 347/101, 347/103, 105, 106, 213; 359/359, 360, 361; 400/106, 120.02, 120.03, 120.04; 427/7, 427/10; 428/13, 29, 41.8, 76, 141, 195, 203, 428/204, 207, 211, 332, 333, 338, 339, 346, 428/347, 409, 411.1, 480; 430/10, 11, 13, 430/14, 270, 945; *B32B 5/16; B41F 1/10; B41J 3/407; B42D 15/02; C09D 11/00; C09G 1/04*
See application file for complete search history.

(56) References Cited

U.S. PATENT DOCUMENTS

| | | | | |
|---|---|---|---|---|
| 3,279,826 | A | | 10/1966 | Ruderhausen et al. |
| 3,614,430 | A | | 10/1971 | Berler |
| 3,763,356 | A | | 10/1973 | Berler |
| 4,536,016 | A | | 8/1985 | Solomon et al. |
| 4,579,754 | A | * | 4/1986 | Maurer et al. ................. 428/29 |

(Continued)

FOREIGN PATENT DOCUMENTS

| | | |
|---|---|---|
| AU | 73762 | 4/1976 |

(Continued)

*Primary Examiner*—Dana Ross
*Assistant Examiner*—Justin V Lewis
(74) *Attorney, Agent, or Firm*—IPLM Group, P.A.

(57) ABSTRACT

The invention relates to the field of printed security documents and, more particularly, to security documents and methods of making security documents bearing enhanced security features. The security documents may include identification documents or any other known documents of value. The security document includes a transparent window area with an ultraviolet blocking agent incorporated therein. Invisible ultraviolet fluorescent ink patterns are printed on respective opposite sides of the ultraviolet blocking agent within the region of the transparent window area. When either the face side or back side of the security document is illuminated with ultraviolet light, only the pattern printed proximate that side within the area of the transparent window becomes visible. When both face and back sides are simultaneously illuminated with ultraviolet light, the patterns printed on both sides of the ultraviolet blocking agent within the area of the transparent window become visible at the same time.

54 Claims, 6 Drawing Sheets

U.S. PATENT DOCUMENTS

| | | | | |
|---|---|---|---|---|
| 4,894,110 | A | | 1/1990 | Lass et al. |
| 5,288,314 | A | * | 2/1994 | Howard et al. ................. 106/3 |
| 5,928,788 | A | * | 7/1999 | Riedl ...................... 428/411.1 |
| 6,155,168 | A | | 12/2000 | Sakamoto |
| 6,221,112 | B1 | | 4/2001 | Snider |
| 6,269,169 | B1 | | 7/2001 | Funk et al. |
| 6,383,627 | B2 | * | 5/2002 | Hashimoto et al. .......... 428/332 |
| 6,428,051 | B1 | | 8/2002 | Herrmann et al. |
| 6,505,779 | B1 | | 1/2003 | Power et al. |
| 6,581,839 | B1 | | 6/2003 | Lasch et al. |
| 6,732,936 | B1 | | 5/2004 | Kickhacfer |
| 6,749,123 | B2 | | 6/2004 | Lasch et al. |
| 6,764,014 | B2 | | 7/2004 | Lasch et al. |
| 2006/0196948 | A1 | | 9/2006 | Weber et al. |

FOREIGN PATENT DOCUMENTS

| | | | | |
|---|---|---|---|---|
| CA | 2313162 | | | 10/1999 |
| EP | 900830 | A1 | * | 3/1999 |
| EP | 1 036 665 | | | 4/2000 |
| JP | 10-250210 | A | | 9/1998 |
| WO | WO 03/095218 | | | 11/2003 |

* cited by examiner

SECURITY DOCUMENT WITH ULTRAVIOLET AUTHENTICATION SECURITY FEATURE

BACKGROUND OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever 1. Field of Invention The present invention relates to the field of printed security documents and, more particularly, to identification documents and documents of value bearing enhanced security features.

2. Description of the Related Prior Art

As will be appreciated by those in the art, printed security documents in the form of identification documents and documents of value are widely used in our daily lives. Such printed security documents include financial transaction cards, driver's licenses, entitlement cards, travel documents (e.g. (e.g. birth certificates), vehicle titles, banknotes and the like. In the case of identification documents, the identification document is used to verify that the document bearer has the rights and privileges associated with the document e.g. to purchase goods on credit, withdraw funds from a bank, operate a motor vehicle, receive government services, cross borders etc. Such identification documents and documents of value have obvious inherent value and, as a result, are particularly subject to counterfeiting. The issuing authority of such security documents must, therefore, seek to ensure that such documents cannot easily be easily forged or altered.

Numerous technologies have emerged over recent years to restrict the ability to fraudulently copy or reproduce identification documents and documents of value while at the same time providing enhanced authentication features. Typical security features currently employed to assist in authenticating genuine documents include, among other things, intaglio printing, holograms, watermarks, micro printing, security threads, and printed indicia sensitive to ultraviolet (UV) or infrared (IR) light.

Recently, security documents have been produced using synthetic substrates rather than conventional paper. By their very nature, synthetic substrates offer some advantages over paper made from natural fibers, one of which is the ability to contain a transparent window within an opaque background. This adds an extra level of difficulty for counterfeiting and allows the authentication of genuine documents to be more certain. In addition, credit cards and other identification cards containing visually transparent zones have been proposed.

For example, U.S. Pat. No. 4,894,110 entitled "Identification with a Visible Authenticity Feature" and issued Jan. 16, 1990 to Lass et al. discloses the imprinting of information on a multilayer identification card by means of a laser beam. The information is recorded by irreversibly changing (blackening) transparent synthetic material. By controlling the laser beam intensity, information is recorded only in one layer or simultaneously in several layers. If the layer arrangement, layer materials and recording parameters (intensity, writing width, etc.) are selected appropriately, images can be produced which change their appearance as the viewing angle is changed. The various visual effects which are obtained using this technique, serve to distinguish the authenticity of the identification card.

The above-cited patent discloses, in particular, an identification card which includes a transparent window. An opaque core layer has a window punched out and is sandwiched between two synthetic transparent layers. The card layers are joined together by applying heat and pressure, the window in the layer being filled in by the melted synthetic transparent layers. In the window, a parallax image can be produced using the laser at different intensities as described above. The parallax image could comprise a logo or emblem, incorporating card-individual data such as an account number.

Similarly, WO 03/095218 A1 entitled "Security Document with Biometric or Photographic Image" and published Nov. 20, 2003, teaches a security document or token in the form of an identity card which incorporates a biometric or photographic image within a transparent region or window such that the image is substantially distinguishable from both sides of the card. The security document includes a transparent substrate of plastics material which is covered with one or more opacifying layers or coatings except in the area of the transparent region or window. Regions of partial or varying opacity are provided adjacent to or surrounding the window. A portion of the photographic image extends into at least one region of partial or varying opacity and another portion of the image extends into the substantially opaque region. The portion of the image which extends into the region of partial or varying opacity is at least partly visible from both sides of the document in transmission, but only visible from one side of the document in reflection.

U.S. Pat. No. 4,536,016 entitled "Banknotes and the Like" and issued Aug. 20, 1985 to Solomon et al. discloses a security token, such as a bank note or identity card comprising a sheet-like substrate made up from film of transparent biaxially oriented polymer. The substrate is coated on both sides with an opacifying pigmentary coating in such a manner so as to leave a transparent area within the film within which an optically variable device may be placed. The substrate bears printed or other identifying indicia and is protected with an intimately bonded layer of transparent polymeric material. The use of an optically variable device within the transparent area of a security token allows it to be viewed from either side of the token and allows optical transmission effects to be employed.

U.S. Pat. No. 6,505,779 entitled "Security Document with Security Marking formed of Transparent Windows" and issued Jan. 14, 2003 to Power et al., discloses a security document with security indicia for preventing unauthorized reproduction wherein the security indicia are formed of at least partly transparent windows formed through the security document. The security document comprises an at least partially transparent substrate having one or more opaque layers applied to at least one of its opposing faces. The windows are comprised of apertures formed through one or more of the opaque layers. Although detectable in transmitted light, the security indicia are located within the bounds of a security pattern acting to visually conceal the security indicia in reflected light. The security pattern may be formed of one or more elements and has a complexity selected to enable the concealment of the security indicia.

A developing trend in the printed security document industry also relies on the application of features which visibly glow in the presence of ultraviolet radiation, but are otherwise undetectable. Specifically, identification documents and documents of value may be printed with indicia sensitive to ultraviolet UV light to provide for enhanced security features.

Ultra-violet light is an invisible part of the light spectrum beyond blue. UV light has a higher frequency (shorter wavelength) than visible light. Indicia or patterns may be printed on identification documents or documents of value with invisible UV fluorescent inks. Invisible fluorescent inks are usually clear and only become visible under exposure to an ultraviolet (UV) light source. Thus, indicia or patterns printed with invisible fluorescent inks can be revealed as many times as needed under UV light. Materials exhibiting this kind of effect are not commonly available to counterfeiters who employ conventional scanning and ink jet or electrostatic printers to reproduce security documents. The presence of such features in a document is, therefore, often accepted as proof of authenticity.

Invisible UV fluorescent inks are currently used to mark currency and many other valuable documents to prevent counterfeiting. Retail stores and banks can rapidly verify the presence of these features with an inexpensive ultraviolet light source. Similarly, passport and visa documents can also be easily examined with suitable equipment at immigration checkpoints to verify the presence of ultraviolet fluorescing elements within the documents, thereby providing a quick initial validation of authenticity.

For example, U.S. Pat. No. 6,155,168 entitled "Information Recording Medium and Information Recording Method Suitable for Security Purposes" and issued Dec. 5, 2000 to Sakamoto, discloses the use of ultraviolet or infrared ink to record a photo-portrait image on an information recording medium corresponding to the same photo-portrait image recorded on a different portion of the information recording medium using coloring ink. As a result, confirmation of the photo-portrait image recorded using ultraviolet or infrared ink with the photo-portrait image recorded using coloring ink may not take place under ordinary conditions since the photo-portrait image recorded using ultraviolet or infrared ink is colorless and transparent within the visible region. However, confirmation of the photo-portrait images is obtained by irradiating the portion of the information recording medium containing the photo-portrait image recorded with ultraviolet or infrared ink with ultraviolet or infrared rays, respectively.

Although the above techniques work adequately for their intended purpose, a superior printed security document may be obtained by taking advantage of the techniques disclosed to produce an identification document or document of value with enhanced security features.

SUMMARY OF THE INVENTION

In order to provide enhanced security features, a security document and method of making such document is disclosed wherein the security document comprises a transparent window with a UV blocking agent incorporated over the transparent window and wherein invisible ultraviolet fluorescent ink patterns are printed proximate respective opposite sides of the UV blocking agent within the area defined by the transparent window. When a face side of the security document is illuminated with UV light, only the fluorescent ink pattern printed within the transparent window area proximate the face side becomes visible. Similarly, when a back side of the security document is illuminated with UV light, only the pattern printed within the transparent window area proximate the back side becomes visible. When both face and back sides of the security document are illuminated with UV light simultaneously, both fluorescent ink patterns printed within the area of the transparent window and on opposite sides of the UV blocking agent become visible. This is a surprising feature not normally associated with UV authentication. Not only are the printed invisible UV fluorescent ink patterns difficult to reproduce, they may further convey meaningful information which may be compared with identical information repeated in another area of the security document in order to determine the document's integrity.

In accordance with one aspect of the invention, there is provided a security document comprising a transparent window formed therein, at least one transparent ultraviolet blocker layer covering at least a portion of the transparent window and at least a first invisible ultraviolet fluorescent ink pattern printed proximate a first side of the at least one transparent ultraviolet blocker layer within the area defined by the transparent window. In a preferred embodiment, a second invisible ultraviolet fluorescent ink pattern is printed proximate a second side of the at least one transparent ultraviolet blocker layer within the area defined by the transparent window.

In accordance with a further aspect of the present invention, a method of applying a security feature to a security document is provided comprising forming a transparent window within the security document, incorporating at least one transparent ultraviolet blocker layer over at least a portion of the transparent window, and printing a first invisible ultraviolet fluorescent ink pattern proximate a first side of the at least one transparent ultraviolet blocker layer such that the first invisible ultraviolet fluorescent ink pattern is axially aligned with said transparent window. In a preferred embodiment, the method includes printing a second invisible ultraviolet fluorescent ink pattern proximate a second side of the at least one transparent ultraviolet blocker layer within the area defined by the transparent window.

Preferably, the invisible UV fluorescent ink patterns printed on each side of the transparent ultraviolet blocker layer within the region of the transparent window will be of a graphical nature, either on their own or collectively when both sides of the document are illuminated simultaneously with UV light, thereby providing for fast and efficient verification of a document's authenticity. However, it will be understood that the UV fluorescent ink patterns may alternatively comprise an array of alphanumeric characters and the array of alphanumeric characters may comprise personal data which is repeated elsewhere on the document in normal-readable form for comparison with the alpha numeric characters.

The advantage of the invention is now readily apparent. Using a visually transparent window incorporating the ultraviolet blocking feature of the present invention, UV fluorescent ink patterns invisible under normal lighting conditions can be embedded within any identification document or document of value. The authenticity of the document can then be verified by illuminating one or both sides of the transparent window with UV light and observing the different visual effects revealed produced on each side by the previously invisible UV fluorescent ink patterns. Alternatively, one or both sides of the transparent window may be illuminated with UV light and the UV fluorescent ink patterns subsequently detected, analyzed and authenticated by a machine or device designed to perform such tasks.

BRIEF DESCRIPTION OF THE DRAWINGS

A better understanding of the invention will be obtained by considering the detailed description below, with reference to the following drawings in which.

DESCRIPTION OF THE PREFERRED EMBODIMENT

The double ultraviolet (UV) security feature of the present invention relies on the presence of a transparent window area within an identification document or any other document of value. Such identification documents or documents of value may include financial transaction cards, driver's licenses, identity cards, passports, banknotes or any other document requiring enhanced security features. It will be appreciated that there are three standard methods by which a transparent window area may be formed within an identification document or document of value, depending on document construction. In a first instance, an opaque core layer may have a window punched therein and is then sandwiched between two synthetic transparent layers. The layers may be bonded together by applying heat and pressure so that the window in the opaque core layer is filled in by the melted synthetic transparent layers, thereby creating a thick semi-rigid structure as is usually associated with ID cards and credit cards. In a second instance, a transparent core polymer substrate may be sandwiched between two opaque layers having axially aligned windows punched therein. Two synthetic transparent layers are then applied on outer sides of the opaque layers and the entire structure may be bonded together by applying heat and pressure so that the windows punched in the opaque layers are filled in by the melted synthetic transparent layers. This construction would be suitable for card type documents containing, for example, a contactless chip and antenna in the inner transparent core. In a third instance, a transparent core polymer substrate may be coated on both sides with an opacifying pigmentary coating in such a manner so as to leave a transparent window area extending through the substrate, the entire structure being sufficiently thin and flexible to be a substitute for paper. Such a construction would be suitable for banknotes, passports, certificates, etc. The present invention is applicable to all three cases as will be described in detail below.

Figure 1A:
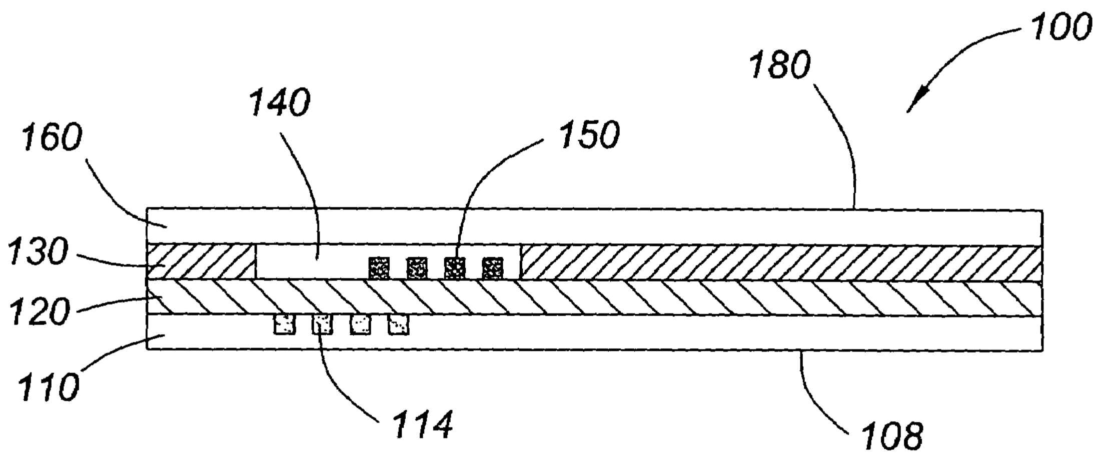
FIG. 1A is a cross-sectional view of a security document comprising an opaque core and incorporating the double ultraviolet security feature of the present invention.

FIGS. 1A-1D depict different views of a security document incorporating the double ultraviolet authentication security feature of the present invention. In the cross-sectional view of FIG. 1A, an identity card 100 is shown comprising an opaque core layer 130, a transparent UV blocking layer 120, a first transparent layer 110 and a second transparent layer 160. A transparent window 140 is located within the opaque core layer 130 in a region where the double ultraviolet security feature is to be located. The transparent window 140 may be formed by 'punching out' a pre-defined section of the opaque layer in a manner well known in the art. A first invisible UV fluorescent ink pattern 114 is printed within the region of the transparent window 140 on a first side of the transparent UV blocking layer 120 and a second invisible UV fluorescent ink pattern 150 is printed within the region of the transparent window 140 on a second side of the transparent UV blocking layer 120. The transparent layers 110 and 160 are protective coatings or layers of polymeric material intimately bonded to either side of the opaque core/transparent UV blocking layer composite. The identity card 100 in FIG. 1A is further defined by a face side 108 and a back side 180.

In terms of fabrication of the identity card in FIG. 1A, the opaque layer 130 may initially be printed with indicia or a background. The transparent window 140 may then be created by "punching out" the required portion of the opaque layer 130 in any manner known in the art. Each side of the transparent UV blocking layer 120 is then printed in such a manner so that the first and second invisible UV fluorescent ink patterns 114 and 150 are located within the region of the transparent window 140 upon assembly of the various layers of the identity card 100. The various layers are assembled in the manner shown with the printed transparent UV blocking layer 120 abutting the face side of the printed opaque layer 130, the first protective transparent layer 110 abutting the face side of the transparent UV blocking layer 120 and the second transparent layer 160 abutting the back side of the opaque core layer 130. As will be readily appreciated by a person skilled in the relevant art, bonding of the above layers may be achieved using heat and/or pressure to facilitate bonding.

Figure 1B:
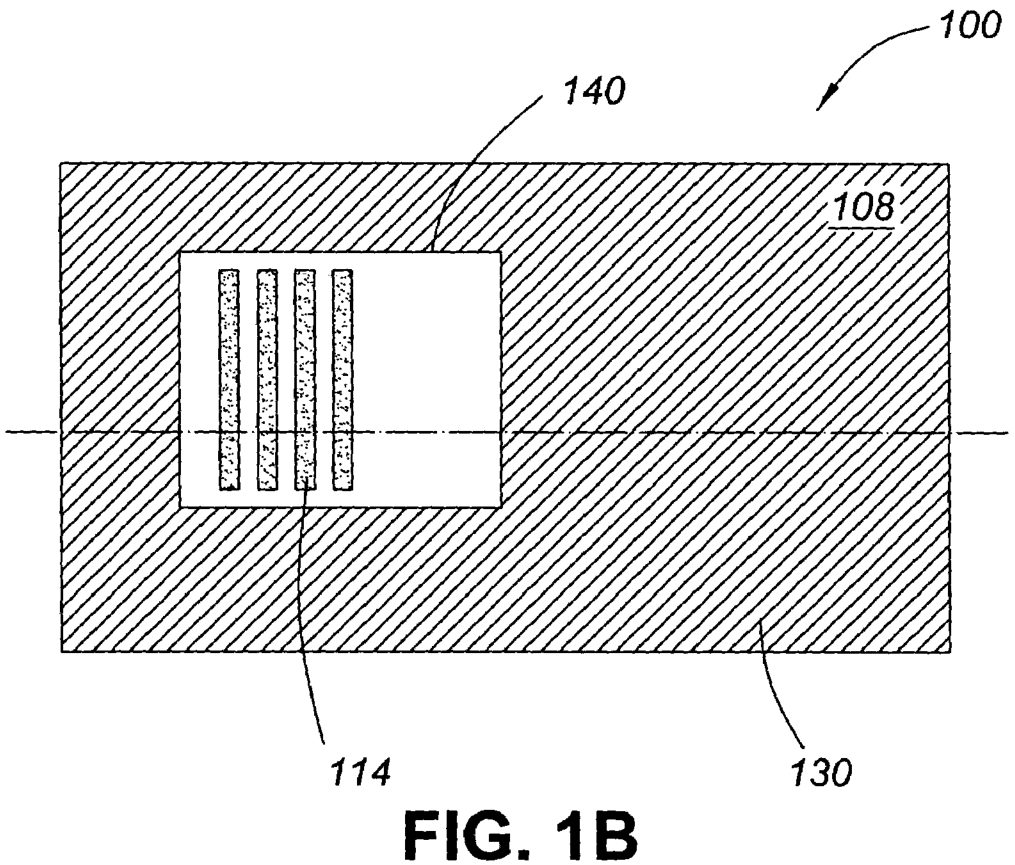
FIG. 1B is a view of the face side of the security document in FIG. 1A when the face side is exposed to an ultraviolet light source.

FIG. 1B depicts a face view of the identity card 100 in FIG. 1A when the face side 108 is illuminated with UV light (not shown). In this instance, only the first invisible UV fluorescent ink pattern 114 within the area of the transparent window 140 becomes visible when the face side 108 of the identity card 100 is illuminated with UV light. Specifically, the transparent UV blocking layer 120 prevents any UV light from penetrating to the back side 180 of the identity card and illuminating the second invisible UV fluorescent ink pattern 150.

Figure 1C:
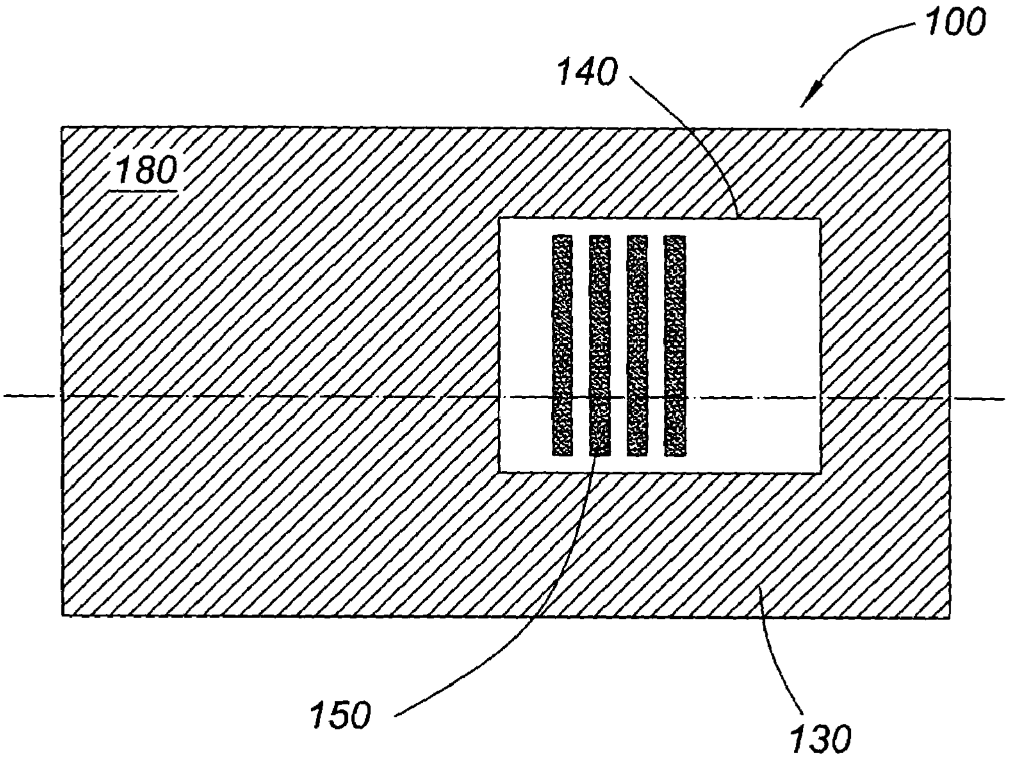
FIG. 1C is a view of the back side of the security document in FIG. 1A when the back side is exposed to an ultraviolet light source.

FIG. 1C depicts a back view of the identity card 100 in FIG. 1A when the back side 180 is exposed to UV light (not shown). In this case, only the second invisible UV fluorescent ink pattern 150 within the area of the transparent window 140 becomes visible when the back side 180 of the identity card 100 is illuminated with UV light. Specifically, the transparent UV blocking layer 120 prevents any UV light from penetrating to the face side 108 of the identity card 100 and illuminating the first invisible fluorescent ink pattern 114.

Figure 1D:
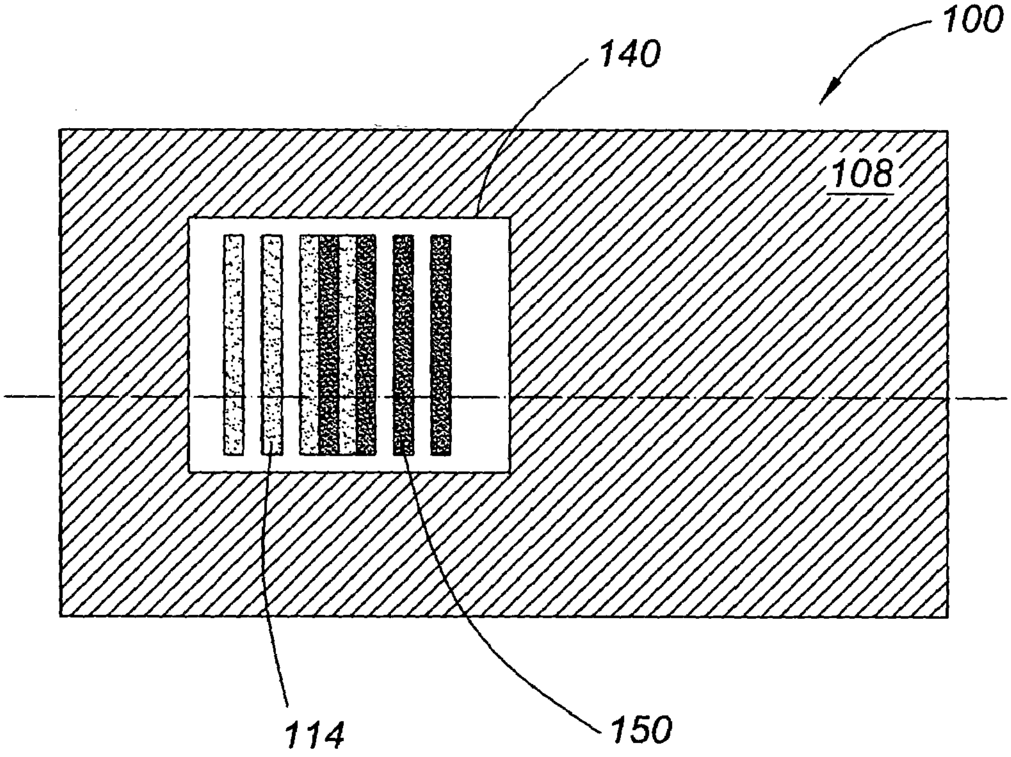
FIG. 1D is a view of the face side of the security document in FIG. 1A when both the face and back sides of the document are simultaneously exposed to an ultraviolet light source.

FIG. 1D depicts a face view of the identity card 100 in FIG. 1A when both the face side 108 and the back side 180 are simultaneously illuminated with UV light (not shown). As can be seen, both the first invisible V fluorescent ink pattern 114 and the second invisible fluorescent ink pattern 150 are visible in the area of the transparent window 140.

In FIGS. 1A-1D, the first invisible UV fluorescent ink pattern 114 is distinguished from the second invisible UV fluorescent ink pattern 150 by using a lighter shade for illustration purposes only. It will be appreciated that the invisible UV fluorescent ink patterns printed on each side of the transparent UV blocking layer 120 may fluoresce the same color or a different color. In addition, each UV fluorescent ink pattern may itself be composed of different colored invisible UV fluorescent inks, if a multi-colored fluorescent pattern is desired. Furthermore, the UV fluorescent ink patterns printed on each side of the transparent UV blocking layer 120 can be complementary or not. In the embodiment of FIG. 1, the first and second invisible UV fluorescent ink patterns 114 and 150 are complementary and together form a partially interlocked image when both sides of the identity card 100 are simultaneously illuminated with UV light.

It will also be appreciated that printing of the invisible UV fluorescent ink patterns 114 and 150 onto the transparent UV blocking layer 120 is optional. In alternate embodiments, for example, the first invisible UV fluorescent ink pattern 114 may be printed on interior surface of the first transparent layer 110 and the second invisible UV fluorescent ink pattern may be printed on the interior surface of the second transparent layer 160, such that both UV fluorescent ink patterns are contained within the transparent window 140.

In the embodiment of FIG. 1, the transparent UV blocking layer 120 is itself a raw layer used in card construction. If such a transparent UV blocking layer is not available, those skilled in the art will readily appreciate that the invisible UV fluorescent ink patterns may be printed onto respective transparent layers 110 and 160, as described above. A UV blocking agent may then be 'printed' on or, alternatively, incorporated within, at least one side of an additional transparent polymeric layer used in the card construction between the opaque core layer and any one of the printed transparent layers.

In this respect, the additional transparent polymeric layer may be printed using any printing process capable of applying a sufficient amount of UV blocking agent, such as flexography, lithography or a silk screen process. Printing of the UV blocking agent on at least one side of the additional transparent polymeric layer may also be localized such that the UV blocking agent only overlays the transparent window when the various layers of the card are assembled.

As mentioned, the UV blocking agent could also be incorporated within an additional transparent polymeric layer using known methods in the art. For example, U.S. Pat. No. 6,221,112 issued to CP Films, Inc., describes a method of applying dyestuff, including UV absorbers, to polyester films. The method described in this document consists of applying a coating onto a polyester film (e.g. the additional transparent polymeric layer) which is then heated so as to have the dyestuff or UV absorber migrate into the film. Alternatively, the UV blocking agent may be compounded directly into the resin prior to forming of the additional transparent polymeric layer.

In accordance with another aspect of the present invention, the double ultraviolet security feature may be incorporated into other types of security documents having transparent window areas incorporated therein, in addition to the identity card 100 described in relation to FIG. 1 above. For example, security documents may, alternatively, be comprised of core substrates made from transparent polymeric materials. In one such case, a transparent window area may be formed by sandwiching a transparent core polymer substrate between two opaque layers having axially aligned windows punched therethrough. At least one transparent UV blocking layer may then be applied to the outer side of at least one of the opaque layers or anywhere between the two opaque layers and the resulting structure may then be sandwiched between two synthetic transparent layers printed with respective invisible fluorescent ink patterns within the region of the transparent axially aligned windows. When the transparent window area on each side of the document is illuminated with UV light, only the image printed on that side becomes visible. When both sides of the window are simultaneously illuminated with UV light, the UV fluorescent patterns printed on both sides of the document become visible at the same time (regardless of the side that the document is viewed from).

Figure 2A:
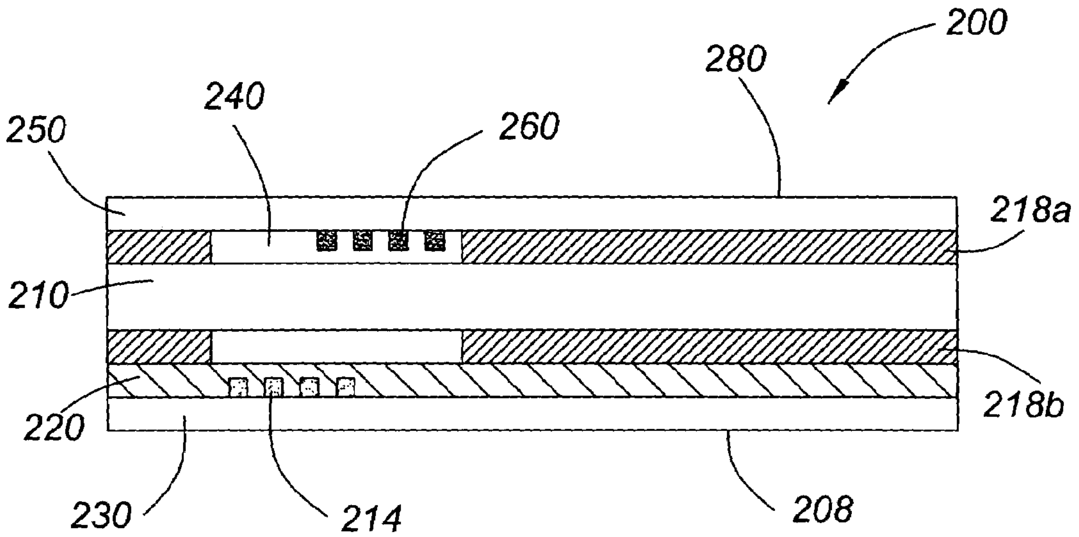
FIG. 2A is a cross-sectional view of a security document comprising a transparent core polymer substrate sandwiched between two opaque layers and incorporating the double ultraviolet security feature of the present invention.

FIGS. 2A-2D illustrate a second aspect of the present invention wherein the double ultraviolet security feature is incorporated into a security document comprising a transparent core polymer substrate as described above. In the cross-sectional view of FIG. 2A, an identity card 200 is shown comprising a transparent core polymer substrate 210 sandwiched between two opaque layers 218*a* and 218*b*, a transparent UV blocking layer 220, a first transparent layer 230 and a second transparent layer 250. Axially aligned transparent window areas 240 are punched in each of the opaque layers 218 in a location where the double ultraviolet security feature is to be located. The transparent window area 240 may be prepared by 'punching out' pre-defined axially aligned rectangular sections of the opaque layers 218 in a manner well known in the art. The transparent UV blocking layer 220 is positioned so as to abut the outer side of opaque layer 218*b*. A first invisible UV fluorescent ink pattern 214 is printed on an interior side of the first transparent layer 230 within the region of the transparent window area 240. Similarly, a second invisible UV fluorescent ink pattern 260 is printed on an interior side of the second transparent layer 250 within the region of the transparent window area 240. The various layers are assembled in the manner shown and bonded using heat and/or pressure as is well known in the art. In FIG. 2A, the security document 200 is further defined by a face side 208 and a back side 280.

Figure 2B:
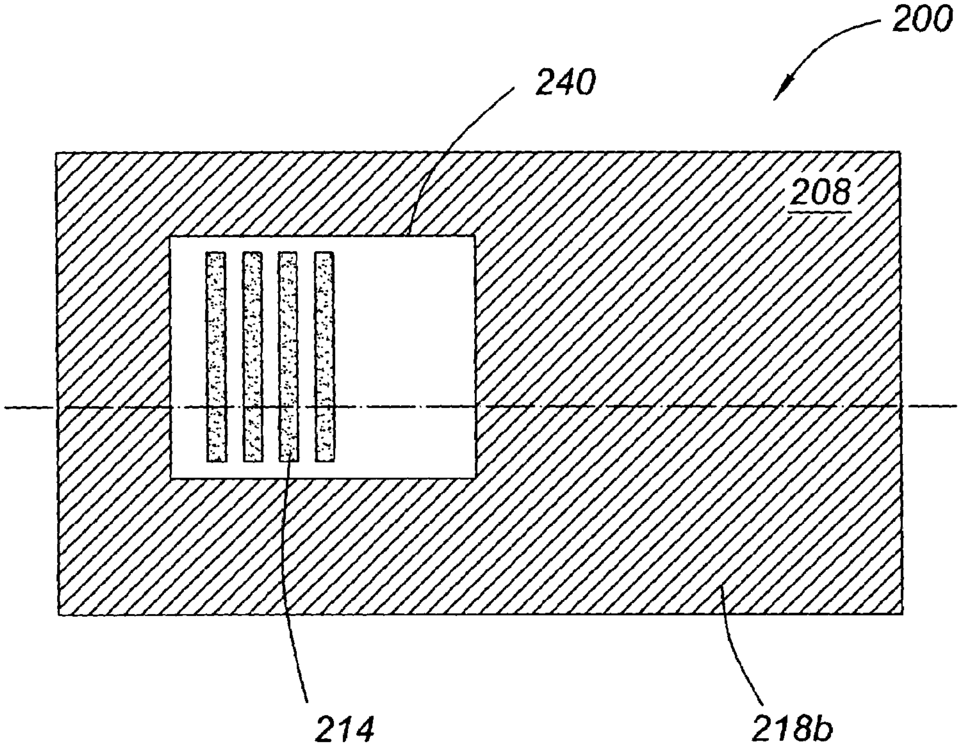
FIG. 2B is a view of the face side of the security document in FIG. 2A when the face side is exposed to an ultraviolet light source.

FIG. 2B depicts a view of the face side 208 of the security document 200 in FIG. 2A when illuminated with an ultraviolet light source (not shown). In this case, only the first invisible UV fluorescent ink pattern 214 is visible within the transparent window area 240. Specifically, the transparent UV blocking layer 220 between opaque layer 218*b* and the first transparent layer 230 prevents any UV light from penetrating through to the back side 280 of the security document 200 and illuminating the second invisible UV fluorescent ink pattern 260. Thus, the second invisible UV fluorescent ink pattern 260 is not exposed and remains hidden or undetected.

Figure 2C:
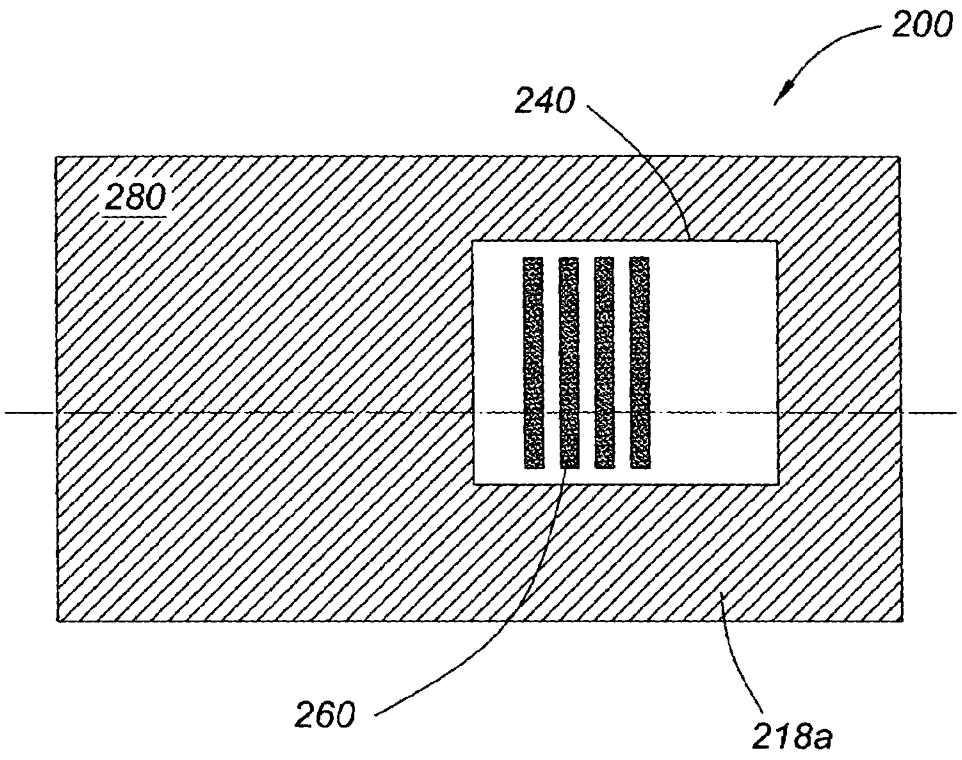
FIG. 2C is a view of the back side of the security document in FIG. 2A when the back side is exposed to an ultraviolet light source.

FIG. 2C depicts a view of the back side 280 of the security document 200 in FIG. 2A when illuminated with an ultraviolet light source (not shown). In this instance, only the second invisible UV fluorescent ink pattern 260 is visible within the transparent window area 240. Specifically, the transparent UV blocking layer 220 prevents UV light from penetrating through to the face side 208 of the security document 200 and illuminating the first invisible UV fluorescent ink pattern 214. The first invisible UV fluorescent ink pattern 214 is not exposed and remains hidden or undetected.

Figure 2D:
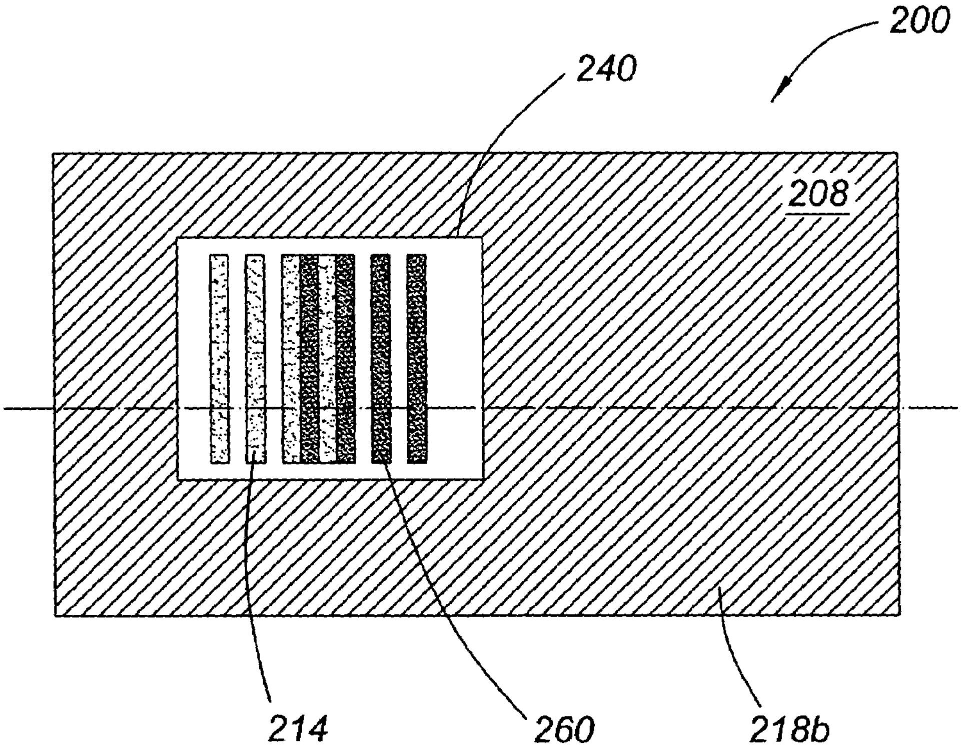
FIG. 2D is a view of the face side of the security document in FIG. 2A when both face and back sides of the document are simultaneously exposed to an ultraviolet light source.

FIG. 2D depicts a view of the face side 208 of the security document 200 in FIG. 2A when both the face side 208 and the back side 280 are simultaneously illuminate with ultraviolet (UV) light (not shown). In this particular instance, both the first invisible UV fluorescent ink pattern 214 and the second invisible UV fluorescent ink pattern 260 are visible from the face side 208 within the transparent window area 240. Specifically, as the back side 280 is simultaneously illuminated with UV light, the second invisible UV fluorescent ink pattern 260 is exposed and may be seen or detected from the face side 208 due to the transparent nature of both the core polymer substrate 210 and the UV blocking layer 220 in the region of the transparent window 240.

Similar to the embodiment in FIG. 1, the transparent UV blocking layer 220 in FIG. 2 is itself a raw layer used in the card construction. However, if such a transparent UV blocking layer is not available, it will be appreciated that a UV blocking agent may alternatively be 'printed' on or incorporated within at least one additional transparent polymeric layer to be used in the card construction as described earlier in relation to FIG. 1. In this case, such an additional transparent polymeric layer may be located between any one of the opaque layers and its corresponding printed transparent layer or, alternatively, anywhere between the two opaque layers. Other possible implementations include the UV blocking agent being directly incorporated into the transparent core polymer substrate 210. In addition, the UV blocking agent may also be printed onto any one of the printed transparent layers 230 or 250 subsequent to printing of its corresponding invisible UV fluorescent ink pattern 214 or 260. Again, those skilled in the art will appreciate that any form of UV blocking layer or coating agent that overlays the area of the transparent window 240 and is interposed between the printed invisible UV fluorescent ink patterns 214 and 260 is sufficient to achieve the novel UV security feature of the present invention.

The transparent window area of a security document having a core substrate made from a transparent polymeric material may alternatively be formed by applying an opacifying pigmentary coating on both sides of the transparent polymeric core in such a manner so as to leave at least one transparent window through the substrate. A visually transparent UV blocking agent may then be applied or printed directly onto at least one side of the exposed transparent polymeric core within the region of the transparent window. The invisible fluorescent ink patterns can subsequently be printed on each side of the security document within the region of the transparent window. Accordingly, when the transparent window area on a given side of the document is illuminated with UV light, only the image printed on that side becomes visible. When both sides of the security document are simultaneously illuminated with UV light, the invisible UV fluorescent ink patterns printed on both sides of the document become visible at the same time, regardless of the side that the document is viewed from.

FIGS. 3A-3D illustrate an alternative aspect of the present invention wherein the double ultraviolet security feature is incorporated within a windowed polymer document 300. Referring to the cross-sectional view in FIG. 3A, the windowed polymer document 300 comprises a transparent core polymer substrate 310 to each side of which is applied an opacifying coating 320. The opacifying coatings 320 are applied in a manner so as to leave a transparent window area 340 passing through the transparent core polymer substrate 310. The polymer document 300 is further defined by a face side 318 and a back side 380. A visually transparent UV blocking agent (or ink) 350 is then applied on each side over the surface area of the transparent core polymer substrate 310 that is left exposed by the transparent window area 340. A first invisible UV fluorescent ink pattern (or image) 314 is printed on the UV blocking agent 350 within the transparent window area 340 on the face side 318 of the transparent core polymer substrate 310 and a second invisible UV fluorescent ink pattern 360 is printed on the UV blocking agent 350 within the transparent window area 340 on the back side 380 of the transparent core polymer substrate 310. Although not shown, it will be appreciated that the polymer document 300 may further include the application of UV transparent protective layers of polymer material to each of its face and back sides subsequent to printing of the UV fluorescent ink patterns in order to protect such patterns as well as other information or indicia recorded on the polymer document 300.

Figure 3A:
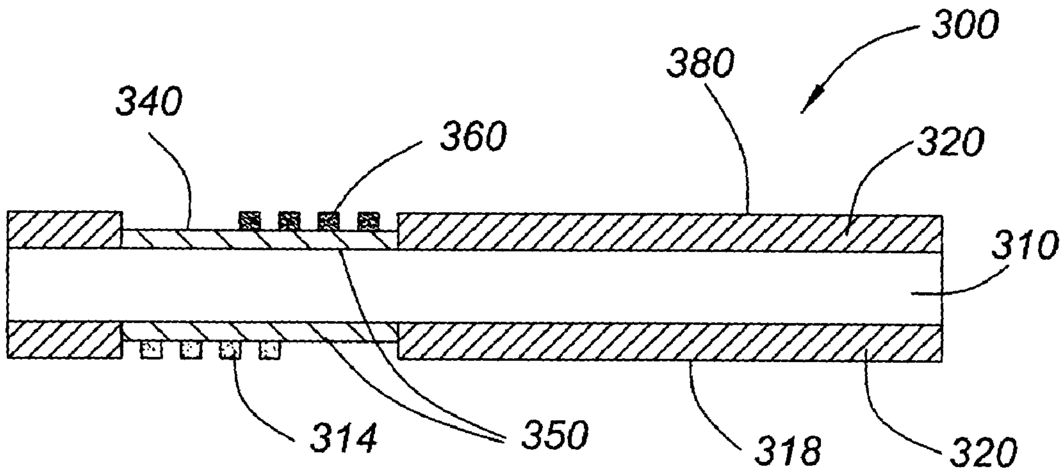
FIG. 3A is a cross-sectional view of a security document comprising a transparent core polymer substrate and incorporating the double ultraviolet security feature of the present invention.
Figure 3B:
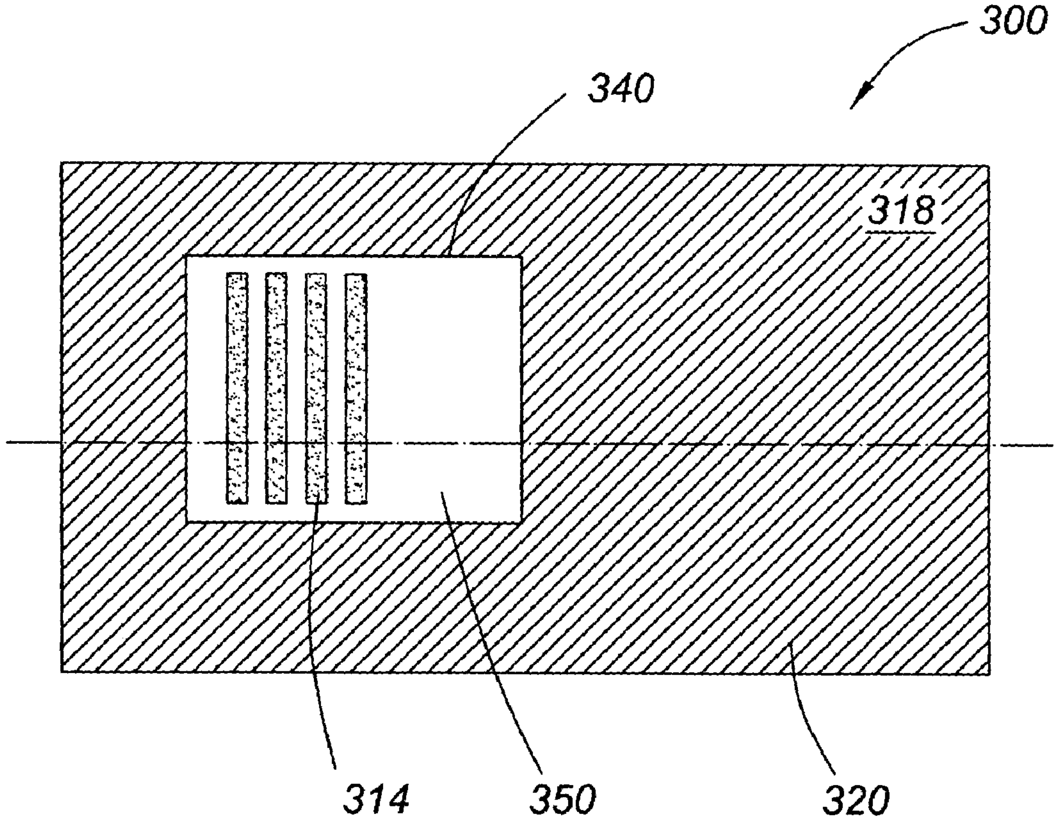
FIG. 3B is a view of the face side of the security document in FIG. 3A when the face side is exposed to an ultraviolet light source.

FIG. 3B depicts a view of the face side 318 of the windowed polymer document 300 in FIG. 3A when illuminated with an ultraviolet (UV) light source (not shown). In this case, only the first invisible UV fluorescent ink pattern 314 is visible in the area of the transparent window 340. Specifically, the UV blocking agent 350 applied over the surface area of the transparent window 340 on the face side 318 of the polymer document 300 prevents any UV light from penetrating through to the back side 380 of the polymer document 300 and illuminating the second invisible UV fluorescent ink pattern 360. The second invisible UV fluorescent ink pattern 360 is not exposed and remains hidden or undetected.

Figure 3C:
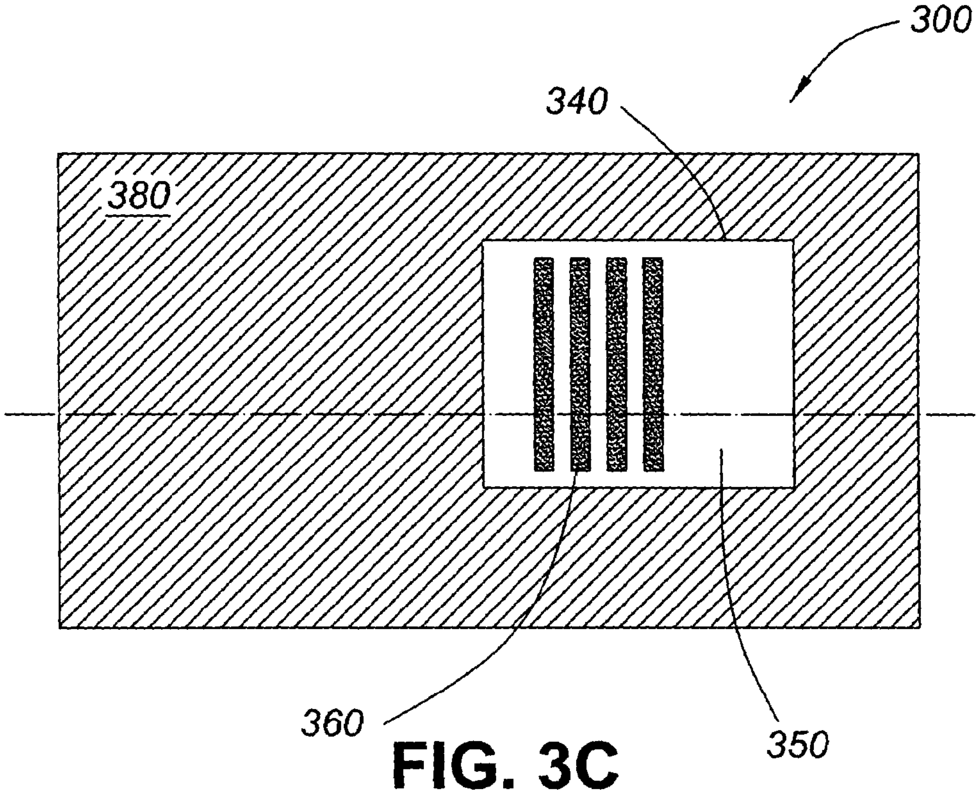
FIG. 3C is a view of the back side of the security document in FIG. 3A when the back side is exposed to an ultraviolet light source.

FIG. 3C depicts a view of the back side 380 of the windowed polymer document 300 in FIG. 3A when illuminated with an ultraviolet (UV) light source (not shown). In this instance, only the second invisible UV fluorescent ink pattern 360 is visible in the area of the transparent window 340. Specifically, the UV blocking agent 350 applied over the surface area of the transparent window 340 on the back side 380 of the transparent core polymer substrate 310 prevents UV light from penetrating through to the face side 318 of the polymer document 300 and illuminating the first invisible UV fluorescent ink pattern 314. Thus, the first invisible UV fluorescent ink pattern 314 is not exposed and remains hidden or undetected.

Figure 3D:
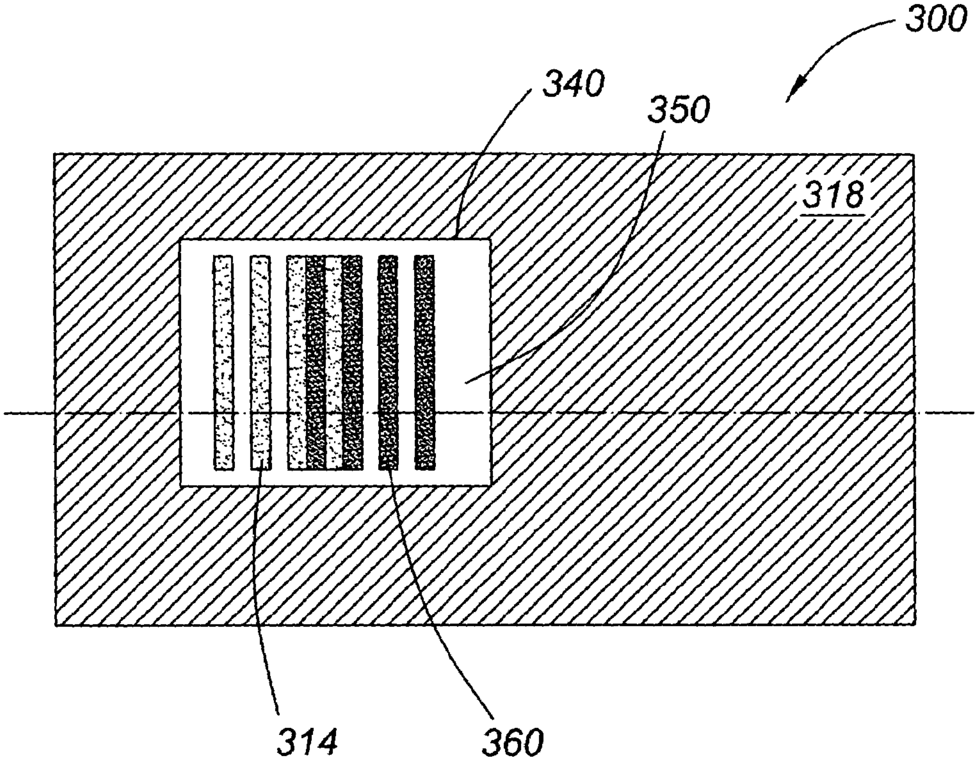
FIG. 3D is a view of the face side of the security document in FIG. 3A when both the face and back sides of the document are simultaneously exposed to an ultraviolet light source.

FIG. 3D depicts a view of the face side 318 of the windowed polymer document 300 in FIG. 3A when both the face side 318 and the back side 380 are simultaneously illuminated with ultraviolet (UV) light (not shown). In this case, both the first and second invisible UV fluorescent ink patterns 314 and 360 are visible within the area of the transparent window 340 from the face side 318 of the polymer document 300. Specifically, as the back side 380 is simultaneously illuminated with UV light, the second invisible UV fluorescent ink pattern 360 becomes visible and may be seen from the face side 318 due to both the transparent nature of the UV blocking agent 350 as well as the transparent nature of the core polymer substrate 310. As was the case for the embodiments depicted in FIGS. 1 and 2, the first and second invisible UV fluorescent ink patterns 314 and 360 in FIG. 3 form a partially interlocked image when both sides of the polymer document 300 are simultaneously illuminated with UV light.

It should be understood that although the polymer document 300 in FIG. 3 is shown having a separate UV blocking agent 350 applied on each of its face side 318 and back side 380 within the area of the transparent window 340, only one such UV blocking agent 350 may be sufficient.

With regard to FIG. 3, the UV blocking agent may alternatively be directly incorporated into the transparent core polymer substrate by well known compounding methods or by the method described, for example, in U.S. Pat. No. 6,221,112, issued to CP Films, Inc. In such cases, the first and second invisible UV fluorescent ink patterns 314 and 360 can then be printed directly onto the treated transparent core polymer substrate 310 within the area of transparent window 340.

It should be appreciated that the configuration of a security document bearing the enhanced ultraviolet security feature of the present invention may be realized in any number of ways. FIGS. 1, 2 and 3 depict but only three such embodiments. Essentially, the inventive security document comprises a transparent window formed within the security document, at least one transparent ultraviolet blocker (or blocking agent) covering at least a portion of the transparent window, and at least one invisible ultraviolet fluorescent ink pattern printed proximate a first side of the at least one transparent ultraviolet blocker within the area defined by the transparent window. Such a security document may, of course, be manufactured in any number of ways depending on whether an opaque or transparent core is to be used and whether the at least one transparent ultraviolet blocker comprises (a) a transparent ultraviolet blocker applied or printed on a transparent polymeric layer (i.e. either a separate intermediate transparent polymeric layer or a transparent core polymer substrate) or (b) an ultraviolet blocking agent incorporated within a transparent polymeric layer (i.e. either a separate transparent polymeric layer or a transparent core polymer substrate) by the dyestuff heating and migrating method described earlier or by compounding.

As described in the embodiments of FIGS. 1, 2 and 3, the invisible UV fluorescent ink patterns formed within the transparent window area of a given security document may be printed using invisible UV fluorescent inks. Such invisible UV fluorescent inks are well known in the art and shall not be discussed. Those skilled in the art will appreciate, however, that invisible UV fluorescent inks may be used in conjunction with the present invention in a manner so as to achieve any desired affect. In this regard, the UV fluorescent ink patterns printed on each side of a given security document may completely differ both in color and content when illuminated with UV light. Alternatively, the UV fluorescent patterns may be independent, complementary or used to create an interference pattern (or new image) when both sides of the document are simultaneously illuminated with UV light. Furthermore, 'partially visible' UV fluorescent inks may also be employed to achieve various desired effects. It will also be appreciated that an invisible UV fluorescent ink pattern may be printed on only a single side of a given security document, depending on the level of security desired.

In other contemplated embodiments, partially visible UV fluorescent ink patterns may be printed on each side of a security document within the region of the transparent window. In addition, the printing of a particular invisible UV fluorescent ink pattern on a given side of a security document is not limited to use of a single invisible UV fluorescent ink. Specifically, more than one invisible UV fluorescent ink may be used to print a single UV fluorescent ink pattern. In other words, a single invisible UV fluorescent ink pattern printed on a given side of a security document made in accordance with the present invention may itself be comprised of different fluorescing colors when illuminated with UV light.

Those skilled in the art will further appreciate that if the transparent UV blocker used in accordance with the present invention is a printed transparent UV blocking agent, the printed transparent UV blocker could itself be patterned in any desired manner so as to leave some areas within the transparent window UV transparent, thereby producing other interesting effects, if so desired.

Although the preferred embodiments described above involve the use invisible UV fluorescent inks, it will be apparent that the invention is not restricted or limited to the use of such fluorescent pigments. For example, phosphorescent pigments are also known to react to UV light and may, in accordance with an alternative embodiment of the present invention, be used to print patterns within the region of a transparent window on either side of a security document.

It should be understood that numerous variations exist with regard to the printing of invisible UV fluorescent ink patterns within the transparent window region on each side of a given security document. For example, well known simultaneous printing techniques may be used to print the invisible UV fluorescent ink patterns on each side of an identity card or document of value so as to form an interlocking image, as was depicted in FIGS. 1, 2 and 3. Furthermore, in cases where invisible UV fluorescent inks differing in color are used within the transparent window area on each side of a given security document, a multicolor see-through register device might be seen when both sides of such security document are simultaneously illuminated with V light. Alternatively, the UV fluorescent ink patterns on each side of a given security document might be tinted in contrasting visible colors, allowing for both visible and UV confirmation. Similarly, other pigments such as optically variable flakes, may be incorporated into the invisible UV fluorescent ink patterns to produce interesting effects, if so desired.

Those skilled in the art will also appreciate that the invisible UV ink patterns located within the transparent window region of a security document constructed in accordance with the present invention may be printed using any one of a number of printing techniques known in the art. For example, such printing methods may include, but are not limited to, lithographic, flexographic, gravure, screen, dye transfer, electrostatic and ink jet printing.

The transparent UV blocker used in the present invention (be it a transparent UV blocking layer, a transparent UV blocking agent printed on an intermediate transparent polymeric layer or a UV blocking agent incorporated within a transparent polymeric layer) may comprise any suitable UV blocking agent known in the art. For example, suitable UV blocking agents may be obtained from Ciba Specialty Chemicals Inc. and include Tinuvin®5050 and Tinuvin®5236 as well as suitable UV blocking agents from the phenyl-triazine and benzotriazole classes, such as Tinuvin®400 and Tinuvin®234, respectively. Alternatively, suitable UV blocking agents from the benzophenone class such as Uvinul®3008 and Uvinul®3050, offered by BASF, or from the cyano diphenyl acrylate class such as Uvinul®3030 and Uvinul®3035 may be used. Suitable UV blocking agents may also include nano-size titanium dioxide and include Hombitec RM 130 F and Hombitec RM 230 L offered, for example, by Sachtleben Chemie GmbH. A nano size zinc oxide, offered by Micronisers Pty Ltd. for example, may also be used as a suitable UV blocking agent. It will be appreciated that the particular choice of UV blocking agent(s) is governed by the method of application, the nature of the substrate and the effect desired.

Those skilled in the art will further understand that the invisible dye/pigments used to print the invisible UV fluorescent ink patterns can be either organic or inorganic in nature. The main criteria are that they are stable under heat and pressure (for the case of laminated security documents), do not fade under UV light, resist flaking and generally provide for longevity. It will be appreciated that thermal stability is even more critical when the security document in question is to be subjected to a lamination process after printing (i.e. for ID cards, passports etc.).

It will further be appreciated that, as an alternative to human authentication, a security document incorporating the ultraviolet security feature of the present invention may be authenticated using automated detection means or the like. In such cases, the spectral characteristics of the UV fluorescent ink and the UV blocker can be matched to specific UV light source wavelengths if the ultraviolet security feature is intended to be detected, analyzed and authenticated by a machine or device designed to perform such tasks.

Finally, the double ultraviolet security authentication feature of the present invention may be incorporated into any type of document requiring enhanced security features. An identification card is one such type of document and could take the form of a bank card, a credit card, a driver's license, a health card or any other card of the like. Typically such identification cards are used to authenticate the individual to which the card was issued along with verifying that the card has not been forged or duplicated. As will also be appreciated, identification cards may also include contact or contactless chips, magnetic or optical stripes, or barcodes each of which can be encoded with personal or biometric information and used as a further level of verification against the human-readable information contained in the identification card. The double ultraviolet security feature of the present invention is also applicable to documents of value such as passports, birth certificates, banknotes, traveler's checks, or the like.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

We claim:

1. A security document having a security feature and a first side and a second side, wherein said security feature comprises:

(a) a transparent window extending through said security document from said first side to said second side;

(b) a transparent ultraviolet light blocking layer within the area defined by said transparent window; and, (c) a printed first ultraviolet fluorescent ink pattern between said transparent ultraviolet light blocking layer and said first side, and within said transparent window, said first ultraviolet fluorescent ink pattern normally being invisible but becoming visible when illuminated with ultraviolet light;

wherein when illuminated with ultraviolet light from said first side, said first ultraviolet fluorescent ink pattern becomes visible in said transparent window when viewed from said first side but is not visible in said transparent window when viewed from said second side.

2. A security document according to claim 1 wherein a printed second ultraviolet fluorescent ink pattern is between said transparent ultraviolet light blocking layer and said second side, and within said transparent window, said second ultraviolet fluorescent ink pattern normally being invisible but becoming visible when illuminated with ultraviolet light, wherein when illuminated with ultraviolet light from said second side, said second ultraviolet fluorescent ink pattern becomes visible in said transparent window when viewed from said second side but is not visible in said transparent window when viewed from said first side.

3. A security document according to claim 2 wherein said first and second ultraviolet fluorescent ink patterns are printed using any one of lithographic, flexographic, gravure, screen, thermal transfer, electrostatic or inkjet printing processes.

4. A security document according to claim 2 wherein said security document comprises an opaque core layer and wherein said transparent window is formed through said opaque core layer.

5. A security document according to claim 4 wherein said transparent ultraviolet light blocking layer abuts said opaque core layer, said first and second ultraviolet fluorescent ink patterns are printed on opposite sides of said transparent ultraviolet light blocking layer within the area defined by said transparent window and wherein a first transparent protective polymeric layer abuts said opaque core layer and a second transparent protective polymeric layer abuts said transparent ultraviolet light blocking layer.

6. A security document according to claim 2 comprising an intermediate opaque layer wherein said transparent window is formed through the opaque layer, wherein said transparent ultraviolet light blocking layer comprises an intermediate transparent polymeric layer printed with an ultraviolet light blocking agent over at least the area defined by said transparent window, and wherein said first ultraviolet fluorescent ink pattern is printed on a first transparent polymeric layer abutting said transparent ultraviolet light blocking layer and said second ultraviolet fluorescent ink pattern is printed on a second transparent polymeric layer abutting said intermediate opaque layer.

7. A security document according to claim 2 wherein said security document comprises a transparent core polymer substrate interposed between first and second opaque layers and wherein said first and second opaque layers have axially aligned windows punched therethrough so as to form said transparent window.

8. A security document according to claim 7 wherein said transparent ultraviolet light blocking layer abuts said first opaque layer and wherein a first transparent polymeric layer abuts said transparent ultraviolet light blocking layer and a second transparent polymeric layer abuts said second opaque layer.

9. A security document according to claim 8 wherein said first ultraviolet fluorescent ink pattern is printed on said first transparent polymeric layer and said second ultraviolet fluorescent ink pattern is printed on said second transparent polymeric layer.

10. A security document according to claim 8 wherein said first and second ultraviolet fluorescent ink patterns are printed on opposite sides of said transparent ultraviolet light blocking layer.

11. A security document according to claim 7 wherein said transparent ultraviolet light blocking layer comprises an intermediate transparent polymeric layer abutting said first opaque layer and printed with an ultraviolet blocking agent over at least the area defined by said transparent window and wherein a first transparent polymeric layer abuts said intermediate transparent polymeric layer and a second transparent polymeric layer abuts said second opaque layer.

12. A security document according to claim 11 wherein said first ultraviolet fluorescent ink pattern is printed on said first transparent polymeric layer and said second ultraviolet fluorescent ink pattern is printed on said second transparent polymeric layer.

13. A security document according to claim 7 wherein said transparent ultraviolet light blocking layer comprises an ultraviolet blocking agent incorporated into said transparent core polymer substrate during fabrication of said transparent core polymer substrate.

14. A security document according to claim 13 wherein said transparent ultraviolet light blocking layer is incorporated into said transparent core polymer substrate by applying a dyestuff comprising an ultraviolet blocking agent to said transparent core polymer substrate and applying heat so as to have said dyestuff migrate into said transparent core polymer substrate.

15. A security document according to claim 14 wherein a first transparent polymeric layer abuts said first opaque layer and a second transparent polymeric layer abuts said second opaque layer.

16. A security document according to claim 15 wherein said first ultraviolet fluorescent ink pattern is printed on said first transparent polymeric layer and said second ultraviolet fluorescent ink pattern is printed on said second transparent polymeric layer.

17. A security document according to claim 2 wherein said security document comprises a transparent core polymer substrate and wherein first and second opacifying coatings are applied over respective first and second sides of said transparent core polymer substrate in a manner so as to form said transparent window.

18. A security document according to claim 17 wherein said transparent ultraviolet light blocking layer comprises an ultraviolet light blocking agent printed on said first side of said transparent core polymer substrate within the area defined by said transparent window, said first ultraviolet fluorescent ink pattern is printed on said ultraviolet light blocking agent and said second ultraviolet fluorescent ink pattern is printed on said second side of said transparent core polymer substrate within the area defined by said transparent window.

19. A security document according to claim 18 wherein said transparent ultraviolet light blocking layer further comprises an ultraviolet light blocking agent printed on said second side of said transparent core polymer substrate within the area defined by said transparent window and wherein said second ultraviolet fluorescent ink pattern is printed on said ultraviolet light blocking agent printed on said second side of said transparent core polymer substrate within the area defined by said transparent window.

20. A security document according to claim 18 further comprising a protective transparent polymeric coating applied to the exposed surface of each of said first and second opacifying coatings and wherein said protective transparent polymeric coatings are transparent to ultraviolet light.

21. A security document according to claim 19 further comprising a protective transparent polymeric coating applied to the exposed surface of each of said first and second opacifying coatings and wherein said protective transparent polymeric coatings are transparent to ultraviolet light.

22. A security document according to claim 19 wherein said first and second ultraviolet fluorescent ink patterns are printed using any one of lithographic, flexographic, gravure, intaglio, screen, thermal transfer, electrostatic or inkjet printing techniques.

23. A security document according to claim 1 wherein said security document is an identification document taken from the group comprising a financial transaction card, a driver's license, an entitlement card and a travel document.

24. A security document according to claim 1 wherein said security document is a document of value taken from the group comprising a banknote, a traveler's check, a security certificate, a vehicle title and a vital statistics document.

25. A security document according to claim 2 wherein said first and second ultraviolet fluorescent ink patterns are of a differing color.

26. A security document according to claim 2 wherein each of said first and second ultraviolet fluorescent ink patterns is composed of a plurality of colors.

27. A security document according to claim 1 wherein said transparent ultraviolet light blocking layer comprises an ultraviolet blocking agent selected from the group consisting of Benzophenone, Benzotriazole, Cyano diphenyl acrylate and Phenyltriazine classes.

28. A security document according to claim 1 wherein said transparent ultraviolet light blocking layer comprises any of nano-size titanium dioxide and nano-size zinc oxide.

29. A security document according to claim 2 wherein said first and second ultraviolet fluorescent ink patterns form a complementary graphical image when both sides of said security document are simultaneously illuminated with ultraviolet light.

30. A security document according to claim 2 wherein said first and second ultraviolet fluorescent ink patterns form an interlocking graphical image when both sides of said security document are simultaneously illuminated with ultraviolet light.

31. A security document according to claim 2 wherein said first and second ultraviolet fluorescent ink patterns comprise a completed array of alphanumeric characters when both sides of said security document are simultaneously illuminated with ultraviolet light.

32. A security document according to claim 31 wherein said completed array of alphanumeric characters comprises personal data, and wherein said personal data is repeated on said security document in normal-readable form for comparison with said completed array of alphanumeric characters.

33. A method of applying a security feature to a security document having a first side and a second side, said method comprising:

(a) forming a transparent window within said security document whereby said transparent window extends through said security document from said first side to said second side;

(b) incorporating a transparent ultraviolet light blocking layer within the area defined by said transparent window; and, (c) incorporating a printed first ultraviolet fluorescent ink pattern between said transparent ultraviolet blocking layer and said first side, within said transparent window, whereby said first ultraviolet fluorescent ink pattern is normally invisible but becomes visible when illuminated with ultraviolet light;

whereby said first ultraviolet fluorescent ink pattern becomes visible in said transparent window when illuminated with ultraviolet light from said first side and viewed from said first side but is not visible when viewed from said second side.

34. A method according to claim 33, and further comprising incorporating a printed second ultraviolet fluorescent ink pattern between said transparent ultraviolet blocking layer and said second side, within said transparent window, whereby said second ultraviolet fluorescent ink pattern is normally invisible but becomes visible when illuminated with ultraviolet light and, whereby said second ultraviolet fluorescent ink pattern becomes visible in said transparent window when illuminated with ultraviolet light from said second side and viewed from said second side but is not visible in said transparent window when viewed from said first side.

35. A method according to claim 34 wherein said first and second ultraviolet fluorescent ink patterns are printed using any one of lithographic, flexographic, gravure, screen, thermal transfer, electrostatic or inkjet printing processes.

36. A method according to claim 34 wherein said security document comprises an opaque core layer and wherein said transparent window is formed in said opaque core layer.

37. A method according to claim 36 wherein said first and second ultraviolet fluorescent ink patterns are printed on respective opposite sides of said transparent ultraviolet light blocking layer in a region corresponding to said transparent window and wherein said transparent ultraviolet light blocking layer is then applied to abut said opaque core layer.

38. A method according to claim 37 further comprising the steps of applying a first protective transparent polymeric layer to the exposed side of said printed transparent ultraviolet light blocking layer and a second protective transparent polymeric layer to said exposed side of said opaque core layer.

39. A method according to claim 36 wherein said transparent ultraviolet light blocking layer is an intermediate transparent polymeric layer printed with a transparent ultraviolet blocking agent over at least a portion of said transparent polymeric layer corresponding to said transparent window, said first and second ultraviolet fluorescent ink patterns are printed on respective opposite sides of said transparent ultraviolet light blocking layer and wherein said transparent ultraviolet light blocking layer is then applied to abut said opaque core layer.

40. A method according to claim 39 further comprising the steps of applying a first transparent polymeric layer to the exposed side of said printed transparent ultraviolet light blocking layer and a second transparent polymeric layer to the exposed side of said opaque core layer.

41. A method according to claim 36 wherein said transparent ultraviolet light blocking layer is an intermediate transparent polymeric layer printed with a transparent ultraviolet blocking agent over at least a portion of said transparent polymeric layer corresponding to said transparent window, said first ultraviolet fluorescent ink pattern is printed on an inner side of a first transparent polymeric layer and said second ultraviolet fluorescent ink pattern is printed on an inner side of a second transparent polymeric layer and wherein said first transparent polymeric layer is applied to abut said transparent ultraviolet light blocking layer and said second transparent polymeric layer is applied to abut said opaque core layer.

42. A method according to claim 34 wherein said security document is comprised of a transparent core polymer substrate and wherein said transparent window is formed by interposing said transparent core polymer substrate between first and second opaque layers having axially aligned windows formed therethrough.

43. A method according to claim 42 wherein said first and second ultraviolet fluorescent ink patterns are printed on respective opposite sides of said transparent ultraviolet light blocking layer and wherein said transparent ultraviolet light blocking layer is applied to abut one of said first and second opaque layers.

44. A method according to claim 42 wherein said transparent ultraviolet light blocking layer is applied to at least one of said first and second opaque layers, said first ultraviolet fluorescent ink pattern is printed on an interior side of a first transparent polymeric layer applied to said transparent ultraviolet light blocking layer and said second ultraviolet fluorescent ink pattern is printed on an interior side of a second transparent polymeric layer applied to one of said first and second opaque layers.

45. A method according to claim 43 further comprising the steps of applying a first protective transparent polymeric layer to an exposed side of said printed transparent ultraviolet light blocking layer and a second protective transparent polymeric layer to an exposed side of one of said first and second opaque layers.

46. A method according to claim 42 wherein said transparent ultraviolet light blocking layer is an intermediate transparent polymeric layer printed with an ultraviolet blocking agent over at least a portion of said intermediate transparent polymeric layer corresponding to said transparent window, said first ultraviolet fluorescent ink pattern is printed on an interior side of a first transparent polymeric layer applied to said transparent ultraviolet light blocking layer and said second ultraviolet fluorescent ink pattern is printed on an interior side of a second transparent polymeric layer applied to one of said first and second opaque layers.

47. A method according to claim 34 wherein said security document is comprised of a transparent core polymer substrate and wherein said transparent window is formed by applying first and second opacifying coatings over respective first and second sides of said transparent core polymer substrate in a manner so as to form axially aligned transparent windows on each side of said transparent core polymer substrate.

48. A method according to claim 47 wherein said transparent ultraviolet light blocking layer comprises an ultraviolet blocking agent applied on a first side of said transparent core polymer substrate within said transparent window, said first fluorescent ink pattern is printed on said transparent ultraviolet light blocking layer and said second fluorescent ink pattern is printed on said second side of said transparent core polymer substrate within said transparent window.

49. A method according to claim 47 wherein said transparent ultraviolet light blocking layer comprises a first ultraviolet light blocking agent applied on a first side of said transparent core polymer substrate within said transparent window and a second ultraviolet blocking agent applied on a second side of said transparent core polymer substrate within said transparent window, and wherein said first fluorescent ink pattern is printed on said first ultraviolet light blocking agent and said second fluorescent ink pattern is printed on said second ultraviolet light blocking agent.

50. A method according to claim 47 further comprising the step of incorporating an ultraviolet light blocking agent within said transparent core polymer substrate during fabrication of said transparent core polymer substrate.

51. A method according to claim 50 wherein said ultraviolet light blocking agent is incorporated into said transparent core polymer substrate by applying a dyestuff comprising said ultraviolet light blocking agent to said transparent core polymer substrate and applying heat so as to have said dyestuff migrate into said transparent core polymer substrate.

52. A method according to claim 50 wherein said first fluorescent ink pattern is printed on said first side of said transparent core polymer substrate within said transparent window and said second fluorescent ink pattern is printed on said second side of said second side of said transparent core polymer substrate within said transparent window.

53. A method according to claim 33 wherein said transparent ultraviolet light blocking layer comprises an ultraviolet blocking agent selected from the group consisting of Benzophenone, Benzotriazole, Cyano diphenyl acrylate and Phenyltriazine classes.

54. A security document according to claim 33 wherein said transparent ultraviolet light blocking layer comprises any of nano-size titanium dioxide and nano-size zinc oxide.

* * * * *